US012649601B2

(12) United States Patent
Martí Mercadé

(10) Patent No.: US 12,649,601 B2
(45) Date of Patent: Jun. 9, 2026

(54) OBJECT CONVEYING AND ORIENTING DEVICE

(71) Applicant: POSIMAT, SA, Barberàdel Vallès (ES)

(72) Inventor: Alex Martí Mercadé, Barcelona (ES)

( * ) Notice: Subject to any disclaimer, the term of this patent is extended or adjusted under 35 U.S.C. 154(b) by 0 days.

(21) Appl. No.: 18/921,374

(22) Filed: Oct. 21, 2024

(65) Prior Publication Data

US 2025/0128847 A1 Apr. 24, 2025

(51) Int. Cl.
| | |
|---|---|
| *B65G 21/20* | (2006.01) |
| *B65B 7/28* | (2006.01) |
| *B65B 43/52* | (2006.01) |
| *B65B 55/06* | (2006.01) |
| *B65B 55/24* | (2006.01) |
| *B65B 61/02* | (2006.01) |
| *B65G 15/62* | (2006.01) |
| *B65G 17/32* | (2006.01) |
| *B65G 47/244* | (2006.01) |

(52) U.S. Cl.
CPC ............ *B65B 43/52* (2013.01); *B65B 7/2842* (2013.01); *B65B 55/06* (2013.01); *B65B 55/24* (2013.01); *B65B 61/02* (2013.01); *B65G 15/62* (2013.01); *B65G 17/323* (2013.01); *B65G 21/2036* (2013.01); *B65G 47/244* (2013.01); *B65G 2201/0244* (2013.01)

(58) Field of Classification Search
CPC .. B65G 47/248; B65G 47/843; B65G 47/252; B65G 17/323
See application file for complete search history.

(56) References Cited

U.S. PATENT DOCUMENTS

| | | | | |
|---|---|---|---|---|
| 3,170,581 | A | * | 2/1965 | Temple ................ A23G 3/0284 414/416.06 |
| 3,757,926 | A | * | 9/1973 | Gendron ............ B65G 21/2036 198/803.5 |
| 3,809,265 | A | * | 5/1974 | Krenke ................ B65G 17/007 137/454.2 |
| 9,254,968 | B2 | * | 2/2016 | Garner ................ B65G 21/2036 |
| 2015/0158674 | A1 | * | 6/2015 | Garner ................ B65G 47/248 198/689.1 |
| 2022/0306400 | A1 | * | 9/2022 | Marti Sala ........... B65G 47/848 |

FOREIGN PATENT DOCUMENTS

| | | | | |
|---|---|---|---|---|
| JP | 04064518 | A | * | 2/1992 |
| JP | 10245114 | A | * | 9/1998 |

* cited by examiner

*Primary Examiner* — Andrew M Tecco
(74) *Attorney, Agent, or Firm* — Eugenio J. Torres-Oyola; Victor M. Rodriguez-Reyes; Rafael Rodriguez-Muriel

(57) ABSTRACT

An object conveying and orienting device comprising a first conveyor belt with a conveying segment (11), guided over a guiding surface and/or between two equidistant guides, and with a retaining device associated with the first conveyor belt (10); an object orienting segment (12), at least partially overlapping the conveying segment (11) in which the first conveyor belt (10) is twisted producing a twisted surface; wherein at least one first opening (41), in communication with at least one suction chamber (40), is defined along the conveying segment (11), on the guiding surface and/or between the equidistant guides, and wherein the retaining device comprises multiple suction cups (30) on the front face of the first conveyor belt, in fluid communication with said at least one suction chamber (40) through openings of the first conveyor belt (10) facing the at least one first opening (41).

20 Claims, 7 Drawing Sheets

OBJECT CONVEYING AND ORIENTING DEVICE

FIELD OF THE ART

The present invention relates to an object conveying and orienting device, typically containers, in a production line, packaging line, labeling line, or the like.

STATE OF THE ART

Object conveying and orienting devices, i.e., devices intended for conveying objects, modifying their orientation while being conveyed, are known.

Examples of such devices are those described in documents CN211641517U, CN212829358U, and CN111689134A, which use a first conveyor belt with a twisted orienting segment that allows modifying the orientation of the objects supported on its surface. However, in these documents the conveyed objects are retained on the first conveyor belt during said orientation change by means of a second twisted conveyor belt facing the first conveyor belt, defining between both a passage with a defined width to retain the objects to be conveyed. This prevents or hinders the adaptation of the device to objects of different shapes and sizes.

An alternative solution described in document EP0956253B1, in which the first conveyor belt is associated, along the orienting segment, with a retaining device consisting of magnets, is also known. This allows metal objects to be retained continuously on the front face of the first conveyor belt without having to retain the objects between the front faces of two opposing conveyor belts. However, this solution only allows handling ferromagnetic objects, therefore not being applicable to another type of non-ferromagnetic receptables, such as receptables made of plastic, glass, cardboard, or other non-ferromagnetic materials such as aluminum.

The present invention solves the foregoing and other problems.

BRIEF DESCRIPTION OF THE INVENTION

The present invention relates to an object conveying and orienting device, as described in claim 1.

In a way that is known, the proposed device comprises a first conveyor belt forming a closed loop, wherein the first conveyor belt comprises:

a conveying segment, defined along a portion of the first conveyor belt and guided over a guiding surface and/or between two equidistant guides, the conveying segment including a retaining device, associated therewith, configured to retain objects to be conveyed on a front face of the first conveyor belt while they are being conveyed along the conveying segment; wherein an object orienting segment, defined along a portion of the first conveyor belt at least partially overlapping the conveying segment, wherein the first conveyor belt is twisted producing a twisted surface the cross-section of which has an increasing and/or decreasing inclination along the object orienting segment.

Therefore, the first conveyor belt defines two consecutive segments, one corresponding to a conveying segment and the other corresponding to a return segment, the ends of the two segments being connected forming a single continuous loop. Therefore, each point of the first conveyor belt will be moved first along the conveying segment and then along the return segment, returning to the starting point of the conveying segment. Said movement of the conveyor belt will be guided by guide surfaces, guides, and/or rollers.

The conveying segment is the segment of the first conveyor belt on which the objects to be conveyed are held while being conveyed, so the first conveyor belt will not be configured to hold objects along the return segment. Typically, this means that there will be an object collection station at the start of the conveying segment and an object delivery station at the end of the conveying segment.

According to the proposed device, the objects are held and retained on the front face of the first conveyor belt, along the conveying segment, by means of the retaining device.

The first conveyor belt also includes an orienting segment, in charge of modifying the orientation of the objects retained on its front face, in order to perform different operations thereon such as, for example, filling, labeling, printing, washing, sterilizing, sealing, transferring the objects from one machine to another of the production or packaging line with a new orientation, placing the objects on a support (known as puck in the industry), or simply releasing the objects from the conveyor belt with the objects being arranged in a new orientation different from the initial orientation.

The orienting segment consists of a segment of the conveyor belt which is twisted, i.e., the cross-section thereof has an increasing, decreasing, or successively increasing and decreasing inclination, for example with respect to the horizontal or with respect to the vertical, along the orienting segment.

This allows the front face of the conveyor belt to have, at one end of the orienting segment, a cross-section in a first orientation, for example horizontal, and to have, at the other end of the orienting segment, or at an intermediate point of the orienting segment, a cross-section in a second orientation different from the first orientation, for example a vertical orientation, with the intermediate regions of the orienting segment with an orientation of increasing or decreasing transition of the cross-section of the front face of the conveyor belt being between the first orientation and the second orientation.

However, the present invention proposes, in a way not known in the prior art, the following:

At least one first opening, in communication with at least one suction chamber, is defined along the conveying segment, on the guiding surface and/or between the equidistant guides, and being covered by a rear face of the first conveyor belt, the at least one suction chamber being connected to at least one air suctioning device; and in that the retaining device comprises multiple suction cups on the front face of the first conveyor belt, each suction cup being in fluid communication with said at least one suction chamber through openings of the first conveyor belt, facing the at least one first opening along the conveying segment, causing suction in each suction cup along the conveying segment.

According to the above, the retaining device comprise multiple suction cups fixed on the front face of the first conveyor belt, each suction cup being in fluid communication with at least one suction chamber, connected to at least one air suctioning device. Said fluid communication is achieved through openings of the first conveyor belt, along the conveying segment, said openings preferably facing the at least one first opening, causing suction in each suction cup along the conveying segment.

The fluid communication is a communication allowing a fluid to circulate between the communicated spaces, in this case the fluid will be ambient air and it will circulate from the interior of the suction cups to the interior of the suction chamber passing through the openings of the first conveyor belt and through the at least one first opening.

In other words, the present invention proposes for the retention of the objects on the conveyor belt to be performed by means of suction cups fixed on the front face of the conveyor belt which apply suction on any object deposited on said conveyor belt, retaining said object fixed to the conveyor belt while being conveyed along the conveying segment.

The suction applied by the suction cups is obtained by putting the inside of each suction cup in communication with a suction chamber where a partial vacuum has been created, while the suction cup is conveyed by the conveyor belt along the conveying segment.

The suction chamber will be in communication with an air suctioning device that will reduce the air pressure inside the suction chamber to a pressure lower than atmospheric pressure, generating a partial vacuum.

According to the above, the first conveyor belt slides in a guided manner, along the conveying segment, over at least a first opening which will be in fluid communication with the suction chamber, said at least a first opening being covered by a rear face of the first conveyor belt. Since the mentioned at least a first opening is covered by the rear face of the first conveyor belt, partial vacuum can be maintained inside the suction chamber.

The first conveyor belt includes openings coinciding with the suction cups which put the inside of the suction cups in fluid communication with the inside of the suction chamber as a result of said rear face of the conveyor belt facing one or a succession of first openings communicated with the suction chamber. This will cause the partial vacuum of the suction chamber to reach the inside of the suction cups, passing through the openings of the conveyor belt and through the at least a first opening covered by the rear face of the conveyor belt.

Said at least a first opening therefore extends from the start of the conveying segment, where the suction cups will start applying suction, to the end of the conveying segment, where the suction cups will stop applying suction on the objects, releasing them.

Said at least a first opening can be defined, along the orienting segment, on the support surface supporting the first conveyor belt and/or between two equidistant guides which define between them a geometric plane.

In coincidence with at least portions of the object orienting segment of the first conveyor belt, the support surface, or the plane defined between the two equidistant guides, is a twisted surface.

The twisted surface and/or the two equidistant guides are configured to guide the first conveyor belt along the orienting segment by twisting it, forming the twisted surface.

The conveyor belt driven over said twisted surface or guided between the two equidistant guides which define between them a twisted geometric plane will adopt the mentioned twisted shape, being twisted, but keeping its rear face facing said at least a first opening, subjected to the partial vacuum of the suction chamber at all times.

It shall be understood that references to geometrical position such as, for example, parallel, perpendicular, tangent, etc. allow deviations of up to ±5° with respect to the theoretical position defined by said nomenclature.

BRIEF DESCRIPTION OF THE FIGURES

The foregoing and other advantages and features will be more fully understood based on the following detailed description of an embodiment in reference to the attached drawings which must be interpreted in an illustrative and non-limiting manner, in which.

DETAILED DESCRIPTION OF THE INVENTION AND OF SEVERAL EMBODIMENTS

The attached figures show illustrative, non-limiting embodiments of the present invention.

According to the basic embodiment of the proposed object conveying and orienting device, said device comprises a first conveyor belt 10 in the form of a closed loop which defines an object conveying segment 11 along a portion of the first conveyor belt 10, and which also defines an object orienting segment 12, at least partially overlapping the conveying segment 11, wherein the first conveyor belt 10 is twisted producing a twisted surface the cross-section of which has an increasing and/or decreasing inclination along the object orienting segment 12.

It is understood that cross-section is a section of the first conveyor belt transverse to its direction of movement, i.e., a cross-section, preferably perpendicular to the direction of movement of said first conveyor belt. It is also understood that a transverse direction is a direction contained in said cross-section and parallel to the surface of the first conveyor belt in said cross-section.

Figure 1:
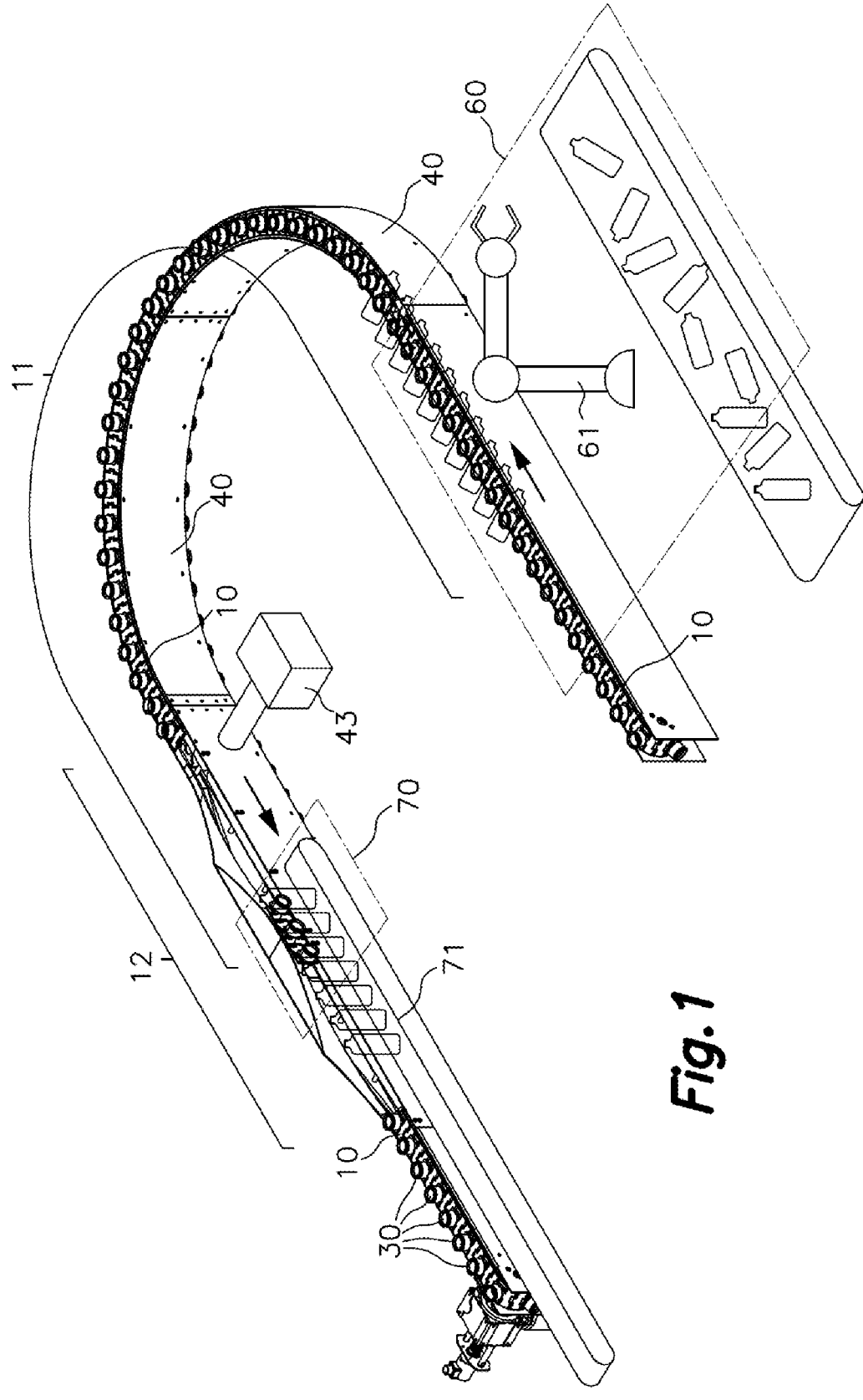
FIG. 1 shows a schematic perspective view of the object conveying and orienting device, including the conveying segment with a first straight segment, a curved segment, and a second straight segment, a part of the second straight segment including an object orienting segment which twists the first conveyor belt rotating the suction cups from a horizontal position to a vertical position. In this embodiment, the object orienting segment extends beyond the end of the conveying segment, where the first conveyor belt is twisted in an opposite direction to return the first conveyor belt to the horizontal position. In this example, the first conveyor belt is a chain in which those twisted portions have not been shown to allow observing the two equidistant guides which guide the chain in the object orienting segment and define between them a twisted geometric plane. Items, in the form of bottles, have been illustrated in both the collection station and the delivery station to facilitate the understanding of the device operation.
Figures 2, 3:
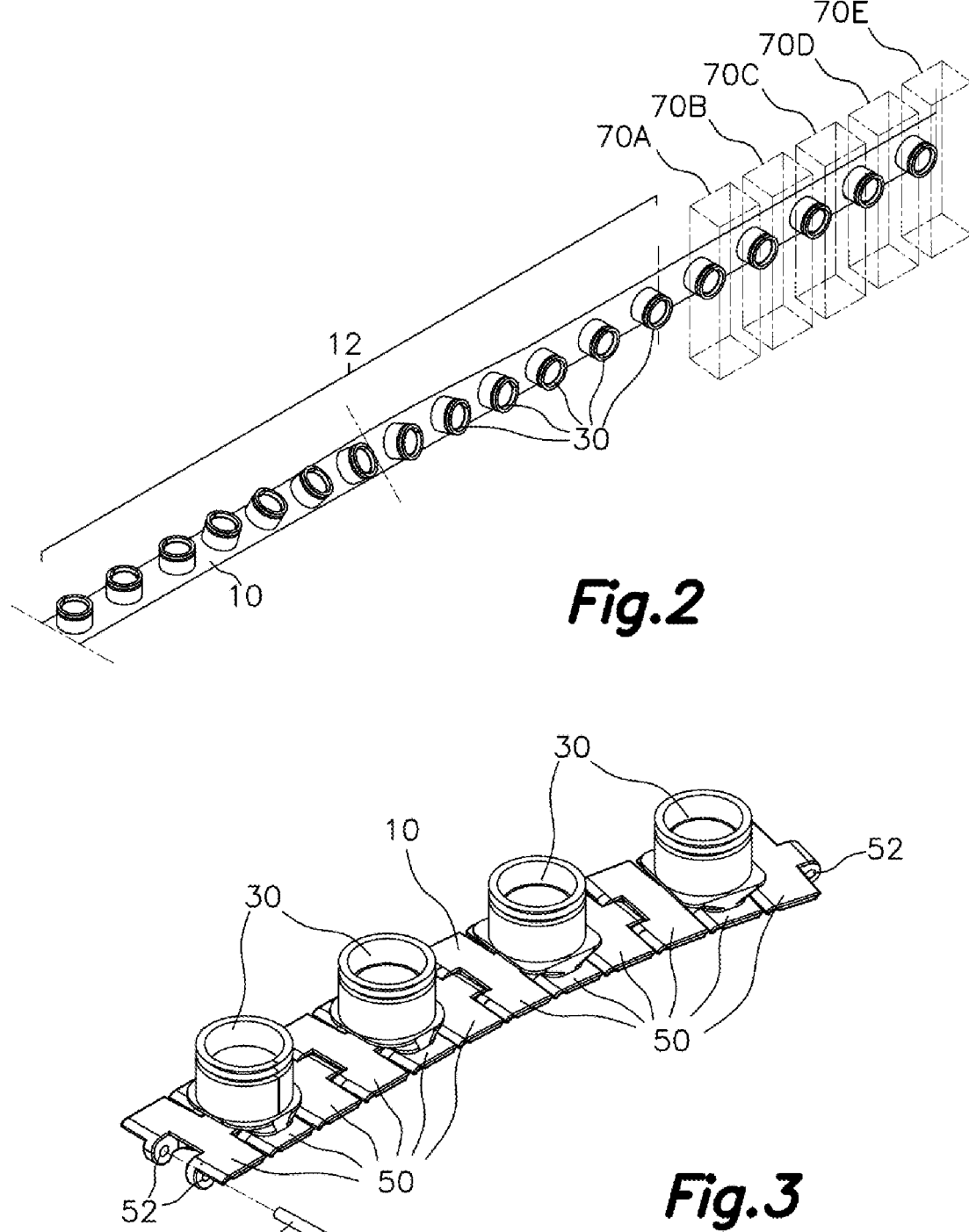
FIG. 2 shows a schematic perspective view of a portion of the orienting segment of the first conveyor belt, which is a flexible conveyor band or a chain illustrated in a simplified manner as a band, including suction cups fixed on said first conveyor belt, wherein the cross-section of the first conveyor belt is horizontal at one end and, passing through cross-sections of increasing intermediate inclinations, reaches a vertical cross-section at an opposite end.
FIG. 3 shows a segment of the first conveyor belt according to an embodiment in which it is a chain of links connected by means of transverse pins inserted into housings of the successive links, providing a transverse articulated attachment between the successive links about each transverse pin, the transverse pins being inserted in the housings by means of a clearance that is sufficient to allow a slight rotation about an axis parallel to the direction of advancement of the first conveyor belt between the successive links, giving the first conveyor belt a capacity to twist around the direction of advancement, within a range of movements typically limited to at least 5° between the successive links. Said clearance can also be provided and sized to allow a certain curvature of the first conveyor belt, keeping the links in one and the same plane, about a third direction perpendicular to the longitudinal direction and to the transverse direction as shown in FIG. 6 and also in FIG. 1. At least some of the links include a perforation therethrough and a suction cup fixed on said perforation, putting the inside of the suction cup in communication with the inside of the suction chamber through the first conveyor belt.
Figure 4:
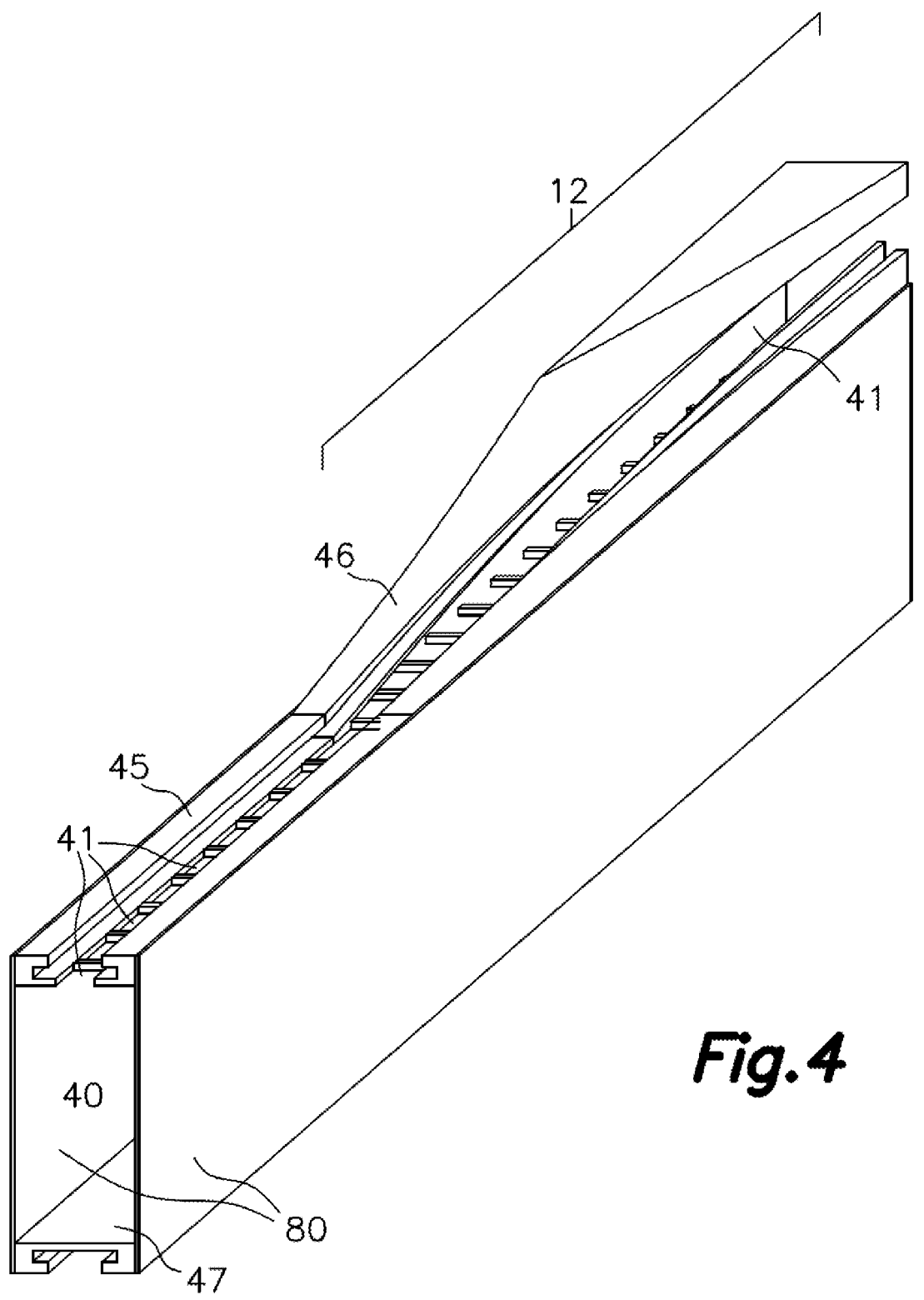
FIG. 4 shows a segment of the suction chamber of the object conveying and orienting device including, closing an upper aperture of said segment of the suction chamber, a first accessory and a second accessory in succession and, closing a lower aperture of said segment of the suction chamber, a third accessory, wherein the first accessory defines a flat surface and two equidistant guides for guiding the first conveyor belt which define between them a flat geometric plane and including the first opening between them, wherein the second accessory defines a twisted surface and two equidistant guides for guiding the first conveyor belt which define between them a twisted geometric plane and include the first opening between them, and wherein the third accessory defines a flat surface and two equidistant guides for guiding the first conveyor belt which define between them a flat geometric plane lacking the first opening between them.

For example, FIG. 2 shows a section of the first conveyor belt twisted from an initial position, the cross-section of which is horizontal, to a final position, the cross-section of which is vertical, causing a 90° orientation change in the cross-section, and therefore also in the objects retained by suction in the suction cups of the first conveyor belt.

Although not shown, other orientation variations less or greater than 90° are possible, for example, a 120° or 180° twist could be made.

After twisting the first conveyor belt in one direction, such as the clockwise rotation shown in FIG. 2, a twist in an opposite counter-clockwise direction will typically be performed to return to the initial orientation.

The orienting segment at least partially overlaps the conveying segment 11, so the retention of objects on the first conveyor belt is maintained at least along part of the orienting segment or optionally along the entire orienting segment, depending on the requirements of the installation.

The proposed device also includes a retaining device, associated with the conveying segment 11, configured to retain objects to be conveyed on a front face of the first conveyor belt 10 while they are being conveyed along the conveying segment 11.

For example, the retention can be maintained during a first twist which induces an orientation change in the objects retained by the retaining device and said retention can end before the opposite twist to return to the initial orientation is performed, thereby releasing the objects after the first twist of the first conveyor belt with the modified orientation thereof.

Alternatively, the retention can be maintained along the entire orienting segment, allowing the objects to be held continuously both when twisting in one direction and when twisting in the opposite direction to return to the initial orientation, allowing an operation to be performed on the objects during the orientation change thereof.

The proposed retaining device comprises multiple suction cups 30 on the front face of the first conveyor belt and at least one suction chamber 40, connected to at least one air suctioning device 43, each suction cup 30 being in fluid communication with said at least one suction chamber 4340 through openings of the first conveyor belt 10, along the conveying segment 11, said fluid communication causing the partial vacuum existent in the interior of the suction chamber to extend to the interior of the suction cups producing suction in each suction cup 30 along the conveying segment 11.

This construction allows the orientation of the conveyed objects to be modified in a simple, economical, and reliable manner.

The first conveyor belt 10 slides in a guided manner, along the conveying segment 11, over a guiding surface and/or between two equidistant guides.

At least a first opening 41, in communication with the suction chamber 40, is defined on said guiding surface and/or between said two equidistant guides, said at least a first opening 41 being in fluid communication with the suction chamber and covered by a rear face of the first conveyor belt 10. According to this, the support surface and/or the space defined between the two equidistant guides are interposed between the first conveyor belt and the suction chamber.

This allows maintaining the partial vacuum within the suction chamber 40, while at the same time allows the fluid communicating the suction cups 30 with said partial vacuum by means of openings on the first conveyor belt 10 that are arranged connected to the interior of the suction cups and facing said at least a first opening 41.

The mentioned at least a first opening 41 extends along the entire conveying segment 11 and can be, for example, an elongated opening, a grill, or a succession of contiguous holes extending along the entire conveying segment 11.

Along the orienting segment 12, the guiding surface and/or a geometric surface defined between the two equidistant guides can be, for example, a twisted surface. In this case, the at least one opening will be also integrated in said twisted surface.

Along the conveying segment 11 not overlapping the orienting segment 12 the guiding surface and/or a geometric surface defined between the two equidistant guides can be preferably a non-twisted surface or a flat surface. In this case, the at least one opening will be integrated in said non-twisted surface or flat surface.

According to the above, said at least one first opening 41 can be defined, along at least a portion of the orienting segment 12, on a twisted surface defined by a portion of the support surface and/or on a twisted geometric plane defined between the two equidistant guides. Said twisted surface which contains the mentioned at least a first opening 41, and/or said two equidistant guides, guide the first conveyor belt, inducing it to twist, converting a segment of the first conveyor belt coinciding with the orienting segment into a twisted surface.

It is also proposed for said at least a first opening 41 to be able to be defined, along the conveying segment 11 not overlapping the orienting segment 12, on a non-twisted surface or a flat surface of the suction chamber 40 and/or between two equidistant guides which define between them a non-twisted or flat geometric plane.

According to one embodiment of the present invention, the guiding surface and/or the two equidistant guides, along the conveying segment 11 not overlapping the orienting segment 12, defining a non-twister or a flat surface with the corresponding at least one opening contained thereon or in-between, can be integrated in a first accessory 45.

Similarly, the guiding surface and/or the two equidistant guides, along the orienting segment 12, defining a twisted surface with the corresponding at least one opening contained thereon or in-between, can be integrated in a second accessory 46.

In this case, the first and second accessories 45, 46 will be attached in succession to the suction chamber 40 occluding an elongated aperture 42 thereof. Because the first and second accessories integrate the at least one opening, said occlusion of the elongated aperture of the suction chamber is only a partial occlusion, allowing the suction to be directed through said at least one opening.

In other words, it is proposed for the suction chamber 40 to have an aperture 42 and for a part of said aperture to be blocked by the first accessory 45 inserted therein. Said first accessory 45 will have the mentioned at least a first opening 41 going through the first accessory 45 putting the partial vacuum inside the suction chamber in communication with the rear face of the first conveyor belt 10 guided on the non-twisted or flat surface or between the equidistant guides which define a non-twisted or flat geometric plane between them, of the first accessory 45.

Similarly, according to this embodiment a part of the aperture 42 of the suction chamber 40 will be blocked by the second accessory 46 inserted therein. Said second accessory 46 will include the twisted surface and/or the equidistant guides which define a twisted geometric plane between them, and will have in addition the mentioned at least a first opening 41 going through the second accessory 46, putting the partial vacuum inside the suction chamber in communication with the rear face of the first conveyor belt 10 guided on the twisted surface or between the equidistant guides which define a twisted geometric plane in the part of the orienting segment coinciding with the conveying segment 11.

The first conveyor belt 10 slides in a guided manner, along a return segment connecting the two ends of the conveying segment 11, forming the closed loop.

Preferably, at least a portion of the return segment slides on a guide surface or between two equidistant guides integrated in a third accessory 47 fixed to the suction chamber occluding a portion of the aperture thereof, the third accessory 47 not including the at least one first opening 41 preventing the fluid communication with the inside of the suction chamber 40.

According to a preferred embodiment, the suction chamber 40 may include two opposing and facing side walls 80 spaced apart by a distance, defining between them the inner space of the suction chamber 40. The distance between edges of the two side walls 80 will define the above mentioned aperture.

The two side walls 80 will be connected through the first and second accessories 45, 46 or through the first, second, and third accessories 45, 46, 47 arranged within the aperture, completing the enclosure of the suction chamber together with the side walls 80. The first, second and optionally the third accessories seal the distance between the two side walls on at least most of its perimeter defining the inner space of the suction chamber where the partial vacuum is contained, channeling the suction through the at least one first opening included in the first and second accessories 45, 46. The third accessory will simply block the aperture, completely closing access to the inside of the suction chamber through the third accessory.

The two walls 80 will be connected to one another through said first and second accessories, for example, by means of screws.

Said third accessory 47 lacks the first opening 41 so it does not communicate the suction cups 30 with the inside of the suction chamber, depriving the suction cups of the vacuum.

Optionally some transverse partition walls 81 are arranged between the two opposing side walls 80. Said partition walls define the start and the end of each suction chamber.

When a single continuous suction chamber is used the transverse partition walls will define the start and the end of the conveying segment 11, in the direction of conveyance. On the other hand, intermediate partition walls may divide the vacuum chamber into different successive independent vacuum chambers, with the at least one opening running along said successive independent vacuum chambers.

Figure 5:
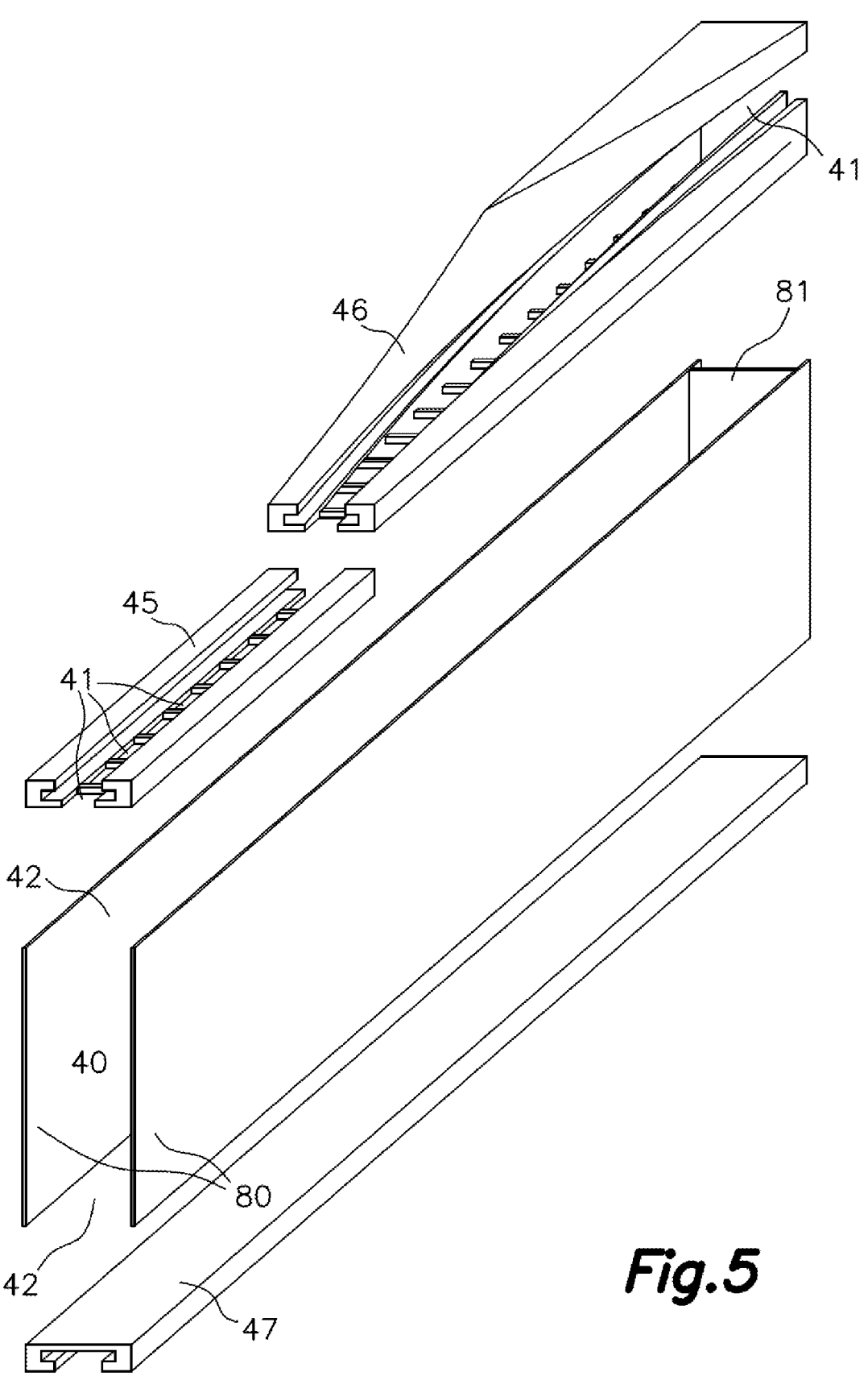
FIG. 5 is the same as FIG. 4 but in an exploded view.
Figure 6:
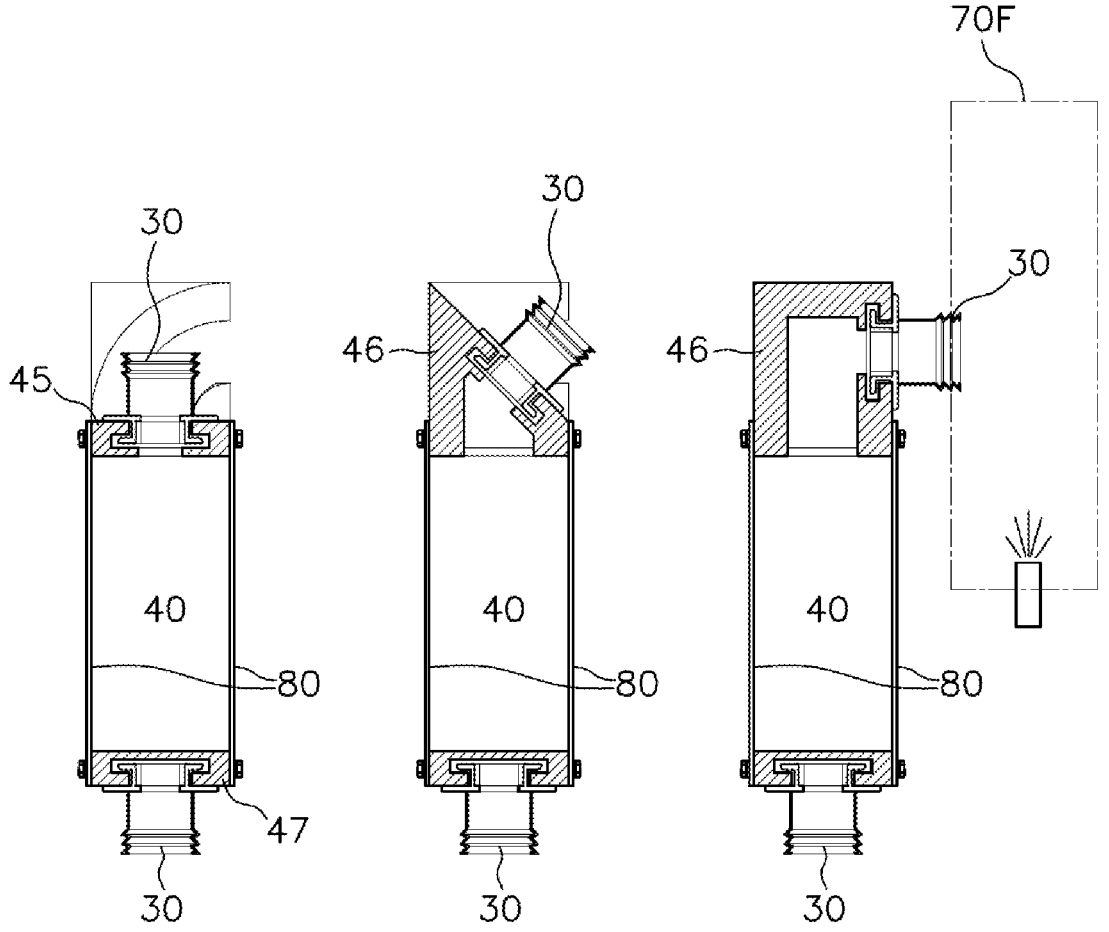
FIG. 6 shows three successive cross-sections of the object orienting segment, showing zero initial transverse twist of the cross-section of the first conveyor belt (section on the left), an intermediate transverse twist of the cross-section of the first conveyor belt, and a final maximum transverse twist of the cross-section of the first conveyor belt, the initial transverse twist being horizontal and the final maximum transverse twist being vertical.
Figure 7:
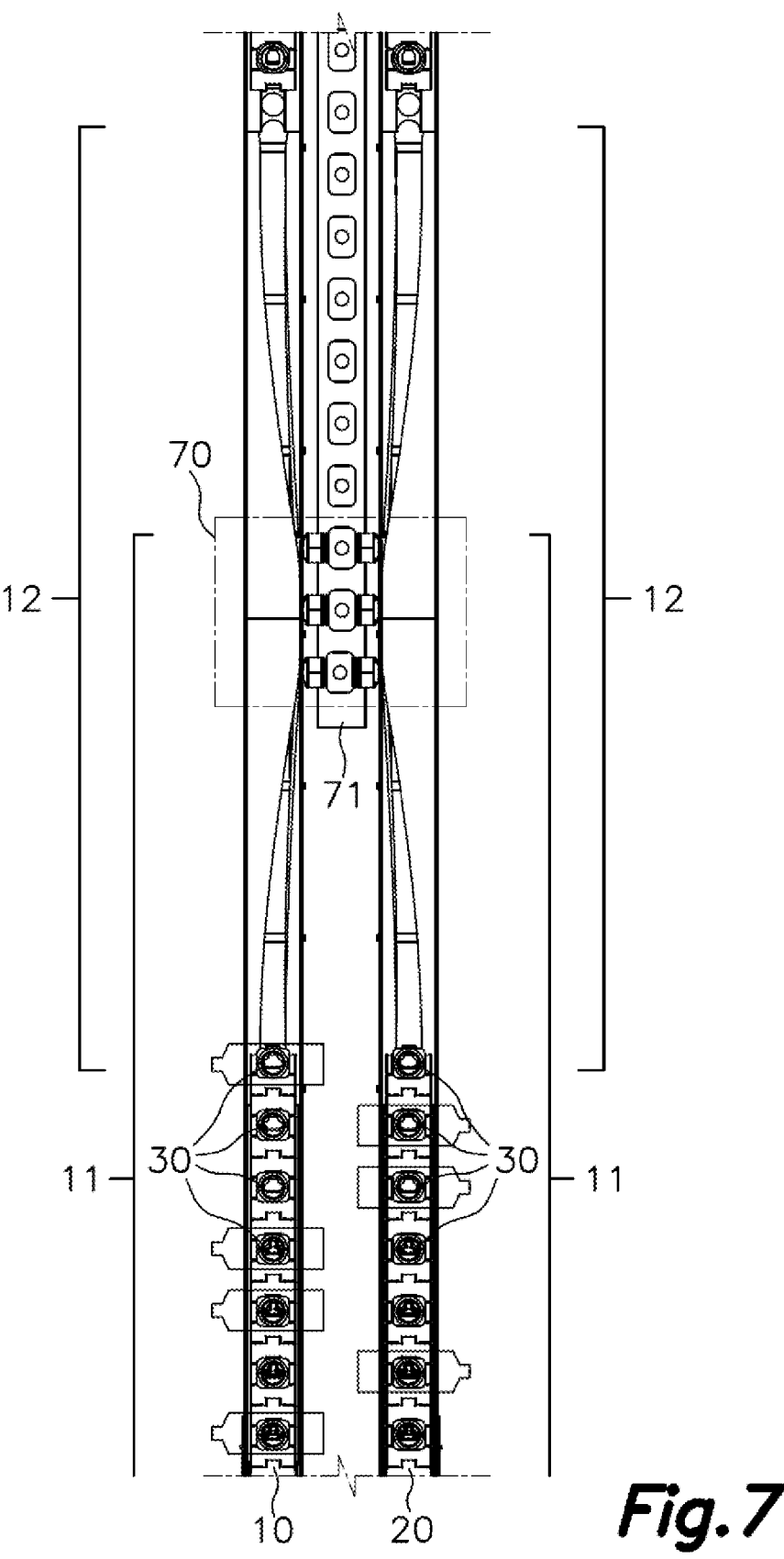
FIG. 7 shows a schematic plan view of a portion of the object conveying and orienting device according to an embodiment in which the device includes a first conveyor belt and a second conveyor belt the object orienting segments of which are symmetrical and have their suction cups facing at least one portion of their path coinciding with the delivery station. This figure includes a schematic depiction of the conveyed and oriented objects which, in this case are bottles, showing that the first conveyor belt conveys the bottles with a first landscape orientation and the second conveyor belt conveys the bottles with a second symmetrical landscape orientation before reaching the orienting segment, said bottles having been collected by the suction cups in these orientations in the collection station, the bottles on the first conveyor belt are not facing the bottles on the second conveyor belt.
Figure 8:
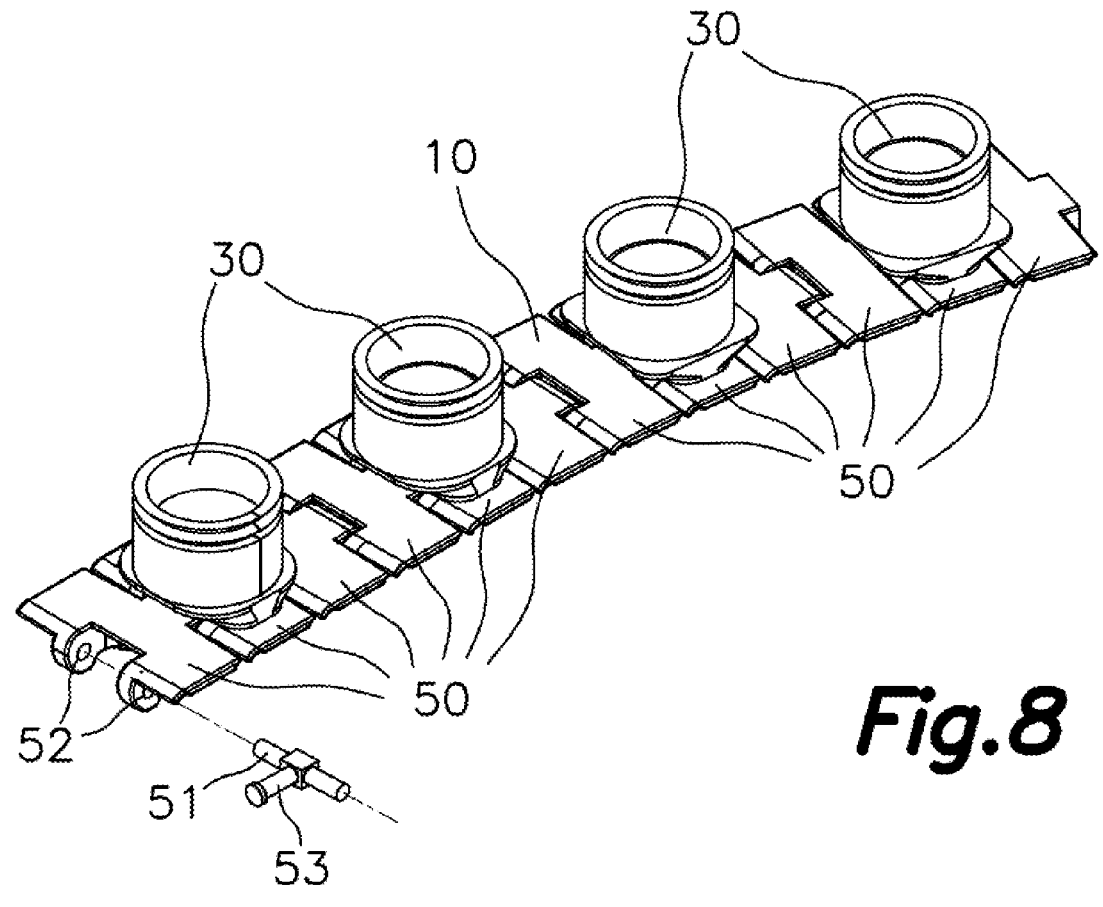
FIG. 8 shows a segment of the first conveyor belt similar to that shown in FIG. 3 but according to an embodiment in which the anchoring element between successive flat links include a transverse pin as a transverse articulated attachment and a longitudinal pin as a longitudinal articulated attachment.

Preferably, said partition walls 81 will extend from a third accessory 47 to a first or a second accessory 45, 46 located on an opposite side of the suction chamber 40, completely closing a side of said suction chamber 40, as shown in FIG. 5.

In the example shown in the figures, the two side walls 80 are two vertical walls 80, defining apertures between the upper and lower edges of the two side walls 80, with the first and second accessories 45, 46 being inserted in the upper aperture, such that along the conveying segment 11, in the part not coinciding with the orienting segment 12, the first conveyor belt 10 is in a horizontal position, with the suction cups 30 oriented upwards.

In this embodiment, at least part of the return segment can be defined in the lower aperture, along which the first conveyor belt 10 runs with the suction cups 30 facing down without suction, although the return segment can also be defined on part of the upper aperture.

The geometry of the twisted support surface and/or the equidistant guides which define between them a twisted geometric plane is a complex geometry that is therefore difficult and expensive to manufacture. Having said elements with a complex geometry contained in a second accessory 46 allows the suction chamber 40 to have a simple construction, concentrating the elements with a complex geometry in the second accessory which can be manufactured with other more suitable techniques for obtaining said complex geometries.

For example, it is proposed for the second accessory to be manufactured by means of additive manufacturing techniques, such as 3D printing, or subtractive manufacturing techniques, such as numerical control milling, allowing the manufacture thereof in metal or plastic. Manufacturing the second accessory by means of molding is also contemplated.

The mentioned at least one aperture 42 of the suction chamber 40, on which the second accessory 46 is fixed, can be defined on a non-twisted surface or a flat surface of the suction chamber 40 and/or between two equidistant edges which define between them a non-twisted geometric plane or a flat geometric plane.

It is understood that said at least a first opening 41 and said at least one aperture 42 covered by the second accessory 46 can be identical and continuous.

This allows a simple construction of the suction chamber 40, that is uniform both in the part of the conveying segment 11 not coinciding with the orienting segment 12 and in the orienting segment 12, with the orienting segment being defined by the addition of the second accessory 46 on the suction chamber 40, which reduces construction cost and simplifies construction, furthermore providing flexibility to modify the orienting segment in a quick and simple manner by simply replacing the second accessory 46.

It is also proposed for said at least one suction chamber 40 to be able to be made up of a succession of suction chamber segments connected to one another, wherein the segments can be selected from: straight segments which define the straight segments of the conveying segment 11, curved segments which define the curved segments of the conveying segment 11, and/or inclined segments which define the inclined segments of the conveying segment 11. This allows standardizing the manufacturing of said segments, while at the same time allows adapting the conveying and orienting device to different applications and locations by simply modifying the combination of segments.

The first conveyor belt 10 can be a band made of a flexible and airproof material, provided with through holes coinciding with the suction cups 30 which will be fixed on its surface.

Alternatively, the first conveyor belt 10 can be a chain of flat links 50 connected to one another by means of anchoring elements provided with a transverse articulated attachment, articulated about an axis transverse to the direction of advancement of the first conveyor belt 10, which allows the first conveyor belt 10 to bend about several transverse axes, converting it into a flexible belt at least in one direction.

Whit this solution, each suction cup will be attached to the rigid surface of one flat link, providing a better and more secure air-tight connection of the suction cup with the first conveyor belt.

The chain of flat links 50 can be connected to one another by means of anchoring elements provided with a transverse articulated attachment, articulated about an axis transverse to the direction of advancement of the first conveyor belt 10, and provided with a longitudinal articulated attachment, articulated about a longitudinal axis parallel to the direction of advancement.

Alternatively, the chain of flat links 50 can be connected to one another by means of anchoring elements provided with a transverse articulated attachment, articulated about an axis transverse to the direction of advancement of the first conveyor belt 10, and provided with a clearance in the transverse articulated attachment selected to act, within a range of movements, as a longitudinal articulated attachment articulated about a longitudinal axis parallel to the direction of advancement, or as a longitudinal articulated attachment articulated about a longitudinal axis parallel to the direction of advancement configured to provide the first conveyor belt 10 with a freedom of twisting movement of at least 5° between the successive links 50.

Small twist between successive links 50, accumulated over multiple links 50, allows achieving any required twist. For example, if the twist between the successive links is 5°, a 90° twist can be achieved for every eighteen links 50, given that 5° is eighteenth part of 90°.

It is contemplated that only some of the links include suction cups 30, intercalating one or more links without suction cups or through holes between the links provided with suction cups (30) and with the corresponding through holes communicating said suction cups with the suction chamber 40.

The mentioned transverse articulated attachment can be provided by transverse pins 51, perpendicular to the direction of advancement of the first conveyor belt 10, inserted into housings 52 of two consecutive links (50) of the first conveyor belt 10 or of two consecutive links of a drive chain on which the links are fixed.

Said pins 51 and the corresponding housings 52 can include the mentioned selected clearance constituting the longitudinal articulated attachment mentioned above.

Alternatively, the longitudinal articulated attachment may be defined by longitudinal pins 53, parallel to the direction of conveyance of the first conveyor belt 10, inserted into housings of two consecutive links 50 of the first conveyor belt 10 or of two consecutive links of the drive chain.

Preferably, the chain of flat links 50 covers, excluding the openings in communication with the suction cups 30, at least 95% or at least 98% of the mentioned at least a first opening 41 in communication with the suction chamber 40. This ensures the ability to maintain a sufficient partial vacuum inside the suction chamber 40 without air entering the links 50 excessively, which may weaken the suction in the suction cups 30 until it becomes insufficient to retain the objects.

According to one embodiment, each suction cup 30 protrudes from the front face of the first conveyor belt 10 lacking a housing around same, each suction cup 30 defining an exposed and accessible contact surface on which the objects to be held are deposited, allowing objects of different sizes to be deposited on the contact surface without requiring adaptations of the suction cups 30. Preferably, the exposed surface is defined on a flexible bellows configuration of the suction cup, allowing for a more flexible adaptation to the shape of the object.

It is also proposed for the object orienting segment 12 to include a first twisted segment twisted in a first direction, from a first orientation to a second orientation, or from a first orientation in which the suction cups are facing upwards to hold objects in a horizontal orientation to a second orientation in which the suction cups are facing sideways to hold objects in a vertical orientation, and optionally a first intermediate segment maintaining the second orientation, located after said first twisted segment.

The end of the first twisted segment, or the first intermediate segment, where the objects are held in the second orientation, is preferably associated with one or several of the following stations:

a labelling station 70C comprising a label applicator configured to be aligned with the objects for printing or adhering labels on the objects;

a filling station 70D including feed nozzles configured to be positioned above and aligned with a filling opening of the objects, held in an upright position, for pouring a product within the filling opening filling the objects, and optionally said feed nozzles being further configured to be coupled to and/or inserted into the filling opening;

a sealing station 70E comprising a seal applicator configured to be positioned above and aligned with a filling opening of the objects, held in an upright position, for sealing the filling opening of the objects with a complementary lid or a cap;

a cleaning station comprising 70A washing nozzles oriented towards the objects configured for projecting a cleaning fluid towards the exterior of the objects;

an inner cleaning station 70F comprising inner washing nozzles configured to be positioned below and aligned with a filling opening of the objects, held in an inverted position, for projecting a cleaning fluid towards the interior of the objects, and optionally said inner washing nozzles being further configured to be inserted into the objects through the filling opening;

a sterilizing station comprising 70B a heat applicator configured for sterilizing the objects with heat;

a delivery station 70 coinciding with the end of the conveying segment 11, causing the release and delivery of the objects in said second orientation.

In such case, the conveying segment 11 can end, coinciding with a delivery station 70, in a portion of the orienting segment 12 arranged in the second orientation, causing the release and delivery of the objects in said second orientation.

Also, before the release of the objects, said objects can be treated by any of the other stations described above when in the second orientation, which is a vertical orientation.

It will be understood that the objects extend from a base end towards a head end of the object defining a main object direction. Preferably, the objects are elongated in said main object direction.

The horizontal orientation and the vertical orientation of the objects are referred to said main object direction. Objects in vertical orientation can be either head up or head down.

Alternatively, the object orienting segment 12 can include, in succession after the first twisted segment or after the first intermediate segment, a second twisted segment twisted in a second direction, from the second orientation to the first orientation, a third twisted segment twisted in the second direction, from the first orientation to a third orientation inverted in regards the second orientation, or to a third orientation in which the suction cups are facing sideways to hold objects in a vertical orientation inverted in regards the second orientation.

Optionally, a second intermediate segment maintaining the first orientation is located between the second and third twisted segments and/or a third intermediate segment maintaining the third orientation is located after the third twisted segment.

The third orientation can be also a vertical orientation but inverted regards to the second orientation, so when the second orientation is a vertical orientation in which the objects are heads down, the third orientation is a vertical orientation in which the objects are heads up, and vice versa.

The end of the third twisted segment, or the third intermediate segment, where the objects are held in the third orientation, is associated with one or several of the above mentioned stations.

According to this, the object conveying and orienting device can first orient all the objects in the second orientation, for example vertical and heads down, performing some operations on the objects through some of the stations, for example cleaning the exterior and/or the interior of the objects, and later the object conveying and orienting device can orient all the objects in the third orientation, for example vertical and heads up, performing other operations thereon through some of the above proposed stations, for example filling the objects, sealing the objects, labeling the objects, and finally releasing the objects.

Both the start and the end of the conveyance segment is defined by the start and the end of said at least a first opening 41 or by the end of the communication of said first opening 41 with the suction chamber 40.

There can be included, as part of the delivery station 70, a delivery conveyor band 71 adjacent to, and at a lower height than, the front face of the first conveyor belt 10 in the portion of the orienting segment 12 arranged in the second orientation, said delivery band 71 receiving, by gravity, the delivered objects by interrupting the suction of the suction cups.

According to a non-limiting example, the first orientation is a landscape orientation in which the front face of the first conveyor belt 10 is arranged substantially horizontal, with the suction cups facing upwards and the second orientation is an upright orientation in which the front face of the first conveyor belt 10 is arranged substantially vertical with the suction cups facing sideways.

Optionally, the object conveying and orienting device includes a second conveyor belt 20 associated with a corresponding retaining device with the same features as the first conveyor belt and the associated retaining device.

The first conveyor belt will have a first twisted segment twisted in a first twisting direction, for example clockwise, opposed to a second twisting direction, for example counterclockwise, of the first twisted segment of the second conveyor belt.

In this case, the end of the first twisted segment, or the first intermediate segment, where the objects are held in the second orientation of both first and second conveyor belts are adjacent to each other sharing at least one of the stations.

In addition, or alternatively, the first conveyor belt will have first, second and third twisted segments twisted in twisting directions opposed to the twisting directions of the corresponding first, second and third twisted segments of the second conveyor belt.

The end of the third twisted segment, or the third intermediate segment where the objects are held in the third orientation of both first and second conveyor belts are adjacent to each other sharing at least one of the stations.

For example, the first twisted segment of the first conveyor belt can rotate in a clockwise first twisting direction, in which case the second and third twisted segments of the first conveyor belt will be twisted in a counter-clockwise second twisting direction. In this example, the first twisted segment of the second conveyor belt will be twisted counter-clockwise in the second twisting direction, and the second and third twisted segments of the second conveyor belt will be twisted clockwise in the first twisting direction.

In this embodiment, an object feeder will be configured to arrange objects in a first predefined orientation on the suction cups 30 of the first conveyor belt 10 and to arrange objects in a second predefined orientation opposite the first predefined orientation on the suction cups of the second conveyor belt 20, all the objects delivered to the same conveyor belt being arranged with the same orientation, for example an horizontal orientation with the head of the object on the left side of the conveyor on the first conveyor belt and with the head on the right side of the conveyor on the second conveyor belt.

This allows speeding up the object delivery process, depositing them on the first conveyor belt or on the second conveyor belt depending on the initial orientation of the object, and therefore depending on which requires less orientation modification by the object feeder. After the orientation modification produced by the corresponding orienting segment of each the first and second conveyor belts, in opposite directions, all the objects will be arranged in one and the same vertical orientation, for example all with the head up.

According to a preferred embodiment, an initial portion of the conveying segment 11 is associated with an object collection station 60 including at least one object feeder 61 which delivers objects to the suction cups 30 so that they are held by suction.

The mentioned at least one feeder can be, for example, at least one robotic arm associated with a viewing camera and with a visual recognition system to detect the position and orientation of objects located within the radius of action of the robotic arm and to control the robotic arm in order to collect one or more objects and deliver them to one of the suction cups 30 with a predefined orientation.

The objects located within the radius of action of the robot will preferably be objects located on a collection band on which the objects will preferably be arranged with a random arrangement.

The invention claimed is:

1. An object conveying and orienting device comprising:
   a suction chamber housing containing a suction chamber connected to at least one air suctioning device, the suction chamber housing comprising a non-twisted base housing with a non-twisted elongated aperture and first and second accessories attached in succession to the non-twisted base housing occluding the non-twisted elongated aperture,
   each first and second accessories includes a guiding surface and/or equidistant guides and at least one first opening on the guiding surface and/or between the equidistant guides, the at least one first opening being in fluid communication with the suction chamber through the non-twisted elongated aperture;
   a first conveyor belt forming a closed loop, the first conveyor belt including a conveying segment guided over the guiding surfaces and/or between two equidistant guides of the first and second accessories, the conveying segment of the first conveyor belt covering the at least one first opening of the first and second accessories;
   the first conveyor belt includes multiple suction cups attached thereto which are in fluid communication with the suction chamber through the at least one first opening of the first and second accessories when the suction cups are on the conveying segment;
   on the first accessory the guiding surface and/or a geometric surface defined between the two equidistant guides is a non-twisted surface or a flat surface; and on the second accessory the guiding surface and/or a geometric surface defined between the two equidistant guides is a twisted surface, defining an object orienting segment of the conveying segment of the first conveyor belt.

2. The object conveying and orienting device according to claim 1, wherein the first conveyor belt slides in a guided manner, along a return segment connecting the two ends of the conveying segment, wherein at least a portion of the return segment slides on a guide surface or between two equidistant guides integrated in a third accessory fixed to the non-twisted base housing occluding a portion of the aperture thereof, the third accessory not including the at least one first opening preventing the fluid communication with the suction chamber.

3. The object conveying and orienting device according to claim 1, wherein the non-twisted base housing includes two opposing and facing side walls spaced apart by a distance defining between them the suction chamber, wherein the distance between the edges of the two side walls defines the aperture, and wherein the two side walls are connected through the first and second accessories.

4. The object conveying and orienting device according to claim 1, wherein the non-twisted base housing includes two opposing and facing side walls spaced apart by a distance defining between them the suction chamber, wherein the distance between the edges of the two side walls defines the aperture.

5. The object conveying and orienting device according to claim 1, wherein the non-twisted base housing is made up of a succession of non-twisted base housing segments connected to one another, wherein the segments are selected from: straight segments defining the straight segments of the conveying segment, curved segments defining the curved segments of the conveying segment, and/or inclined segments defining the inclined segments of the conveying segment.

6. The object conveying and orienting device according to claim 1, wherein the first conveyor belt is:
   a chain of flat links connected to one another by anchoring elements provided with a transverse articulated attachment, articulated about an axis transverse to the direction of advancement of the first conveyor belt, and provided with a longitudinal articulated attachment, articulated about a longitudinal axis parallel to the direction of advancement.

7. The object conveying and orienting device according to claim 6, wherein the transverse articulated attachment is provided by transverse pins, perpendicular to the direction of advancement of the first conveyor belt, inserted into housings of two consecutive links of the first conveyor belt or of two consecutive links of a drive chain on which the links are fixed, and wherein the longitudinal articulated attachment is provided by:
   the pins and the corresponding housings including the mentioned selected clearance; or
   longitudinal pins, parallel to the direction of conveyance of the first conveyor belt, inserted into housings of two consecutive links of the first conveyor belt or of two consecutive links of the drive chain.

8. The object conveying and orienting device according to claim 6, wherein the chain of flat links covers, excluding the openings in communication with the suction cups, at least 95% of the mentioned at least a first opening in communication with the suction chamber.

9. The object conveying and orienting device according to claim 1, wherein each suction cup protrudes from the front face of the first conveyor belt lacking a housing around same, each suction cup defining an exposed and accessible contact surface on which contact surface the objects to be held are deposited, allowing objects of different sizes to be deposited on the contact surface without requiring adaptations of the suction cups.

10. The object conveying and orienting device according to claim 1, wherein the object orienting segment includes a first twisted segment twisted in a first direction, from a first orientation to a second orientation, or from a first orientation wherein the suction cups are facing upwards to hold objects in a horizontal orientation to a second orientation wherein the suction cups are facing sideways to hold objects in a vertical orientation, or the object orienting segment includes a first twisted segment twisted in a first direction, from a first orientation to a second orientation, or from a first orientation wherein the suction cups are facing upwards to hold objects in a horizontal orientation to a second orientation wherein the suction cups are facing sideways to hold objects in a vertical orientation, and also includes a first intermediate segment maintaining the second orientation, located after the first twisted segment.

11. The conveying and orienting device according to claim 10, wherein the end of the first twisted segment, or the first intermediate segment, where the objects are held in the second orientation, is associated with one or several of the following stations:

a labelling station comprising a label applicator configured to be aligned with the objects for printing or adhering labels on the objects; and/or a filling station including feed nozzles configured to be positioned above and aligned with a filling opening of the objects, held in an upright position, for pouring a product within the filling opening filling the objects; and/or a sealing station comprising a seal applicator configured to be positioned above and aligned with a filling opening of the objects, held in an upright position, for sealing the filling opening of the objects with a complementary cap; and/or a cleaning station comprising washing nozzles oriented towards the objects configured to project a cleaning fluid towards the exterior of the objects; and/or an inner cleaning station comprising inner washing nozzles configured to be positioned below and aligned with a filling opening of the objects, held in an inverted position, configured to project a cleaning fluid towards the interior of the objects; and/or a sterilizing station comprising a heat applicator configured to sterilize the objects with heat.

12. The conveying and orienting device according to claim 11, wherein the object orienting segment includes, in succession after the first twisted segment or after the first intermediate segment:

a second twisted segment twisted in a second direction, from the second orientation to the first orientation; or a third twisted segment twisted in the second direction, from the first orientation to a third orientation inverted in regards the second orientation, or a second twisted segment twisted in a second direction, from the second orientation to the first orientation; followed by a third twisted segment twisted in the second direction, from the first orientation to a third orientation inverted in regards the second orientation; or a second twisted segment twisted in a second direction, from the second orientation to the first orientation; followed by a second intermediate segment maintaining the first orientation, followed by a third twisted segment twisted in the second direction, from the first orientation to a third orientation inverted in regards the second orientation; or a third twisted segment twisted in the second direction, from the first orientation to a third orientation inverted in regards the second orientation, followed by a third intermediate segment maintaining the third orientation; or a second twisted segment twisted in a second direction, from the second orientation to the first orientation; followed by a third twisted segment twisted in the second direction, from the first orientation to a third orientation inverted in regards the second orientation, followed by a third intermediate segment maintaining the third orientation; or a second twisted segment twisted in a second direction, from the second orientation to the first orientation; followed by a second intermediate segment maintaining the first orientation, followed by a third twisted segment twisted in the second direction, from the first orientation to a third orientation inverted in regards the second orientation followed by a third intermediate segment maintaining the third orientation.

13. The object conveying and orienting device according to claim 12, wherein the end of the third twisted segment, or the third intermediate segment, where the objects are held in the third orientation, is associated with one or several of the following stations:

a labelling station comprising a label applicator configured to be aligned with the objects for printing or adhering labels on the objects;

a filling station including feed nozzles configured to be positioned above and aligned with a filling opening of the objects, held in an upright position, for pouring a product within the filling opening filling the objects, and optionally the feed nozzles being further configured to be coupled to and/or inserted into the filling opening;

a sealing station comprising a seal applicator configured to be positioned above and aligned with a filling opening of the objects, held in an upright position, for sealing the filling opening of the objects with a complementary lid or a cap;

a cleaning station comprising washing nozzles oriented towards the objects configured for projecting a cleaning fluid towards the exterior of the objects;

an inner cleaning station comprising inner washing nozzles configured to be positioned below and aligned with a filling opening of the objects, held in an inverted position, for projecting a cleaning fluid towards the interior of the objects, and optionally the inner washing nozzles being further configured to be inserted into the objects through the filling opening;

a sterilizing station comprising a heat applicator configured for sterilizing the objects with heat;

a delivery station coinciding with the end of the conveying segment, causing the release and delivery of the objects in the second orientation.

14. The object conveying and orienting device according to claim 11 wherein the object conveying and orienting device includes a second conveyor belt associated with a corresponding retaining device with the same features as the first conveyor belt and the associated retaining device, wherein the first conveyor belt having a first, second and third twisted segments twisted in twisting directions opposed to the twisting directions of the corresponding first, second and third twisted segments of the second conveyor belt, the end of the third twisted segment, or the third intermediate segment, where the objects are held in the third orientation of both first and second conveyor belts are adjacent to each other sharing at least one of the labelling, filling, sealing, cleaning, inner cleaning, sterilizing and delivery stations.

15. The object conveying and orienting device according to claim 10 wherein the object conveying and orienting device includes a second conveyor belt associated with a corresponding retaining device with the same features as the first conveyor belt and the associated retaining device, wherein the first conveyor belt has a first twisted segment twisted in a first twisting direction opposed to a second twisting direction of the first twisted segment of the second conveyor belt, and the end of the first twisted segment, or the first intermediate segment, where the objects are held in the second orientation of both first and second conveyor belts are adjacent to each other sharing at least one of the labelling, filling, sealing, cleaning, inner cleaning, sterilizing and delivery stations.

16. The object conveying and orienting device according to claim 1, wherein an initial portion of the conveying segment is associated with an object collection station including at least one object feeder configured to deliver one object to each suction cup with a predefined orientation or including at least one object feeder comprising one robotic arm associated with a viewing camera and with a visual recognition system, the robotic arm being configured to collect one or more objects in an initial orientation, or one or more objects in an initial orientation from a collection band, and deliver the objects to one of the suction cups with a predefined orientation.

17. The object conveying and orienting device according to claim 1, wherein the first conveyor belt is a band made of a flexible and airproof material, provided with through-holes coinciding with the suction cups.

18. The object conveying and orienting device according to claim 1, wherein the first conveyor belt is a chain of flat links connected to one another by anchoring elements provided with a transverse articulated attachment, articulated about an axis transverse to the direction of advancement of the first conveyor belt, and provided with a clearance in the transverse articulated attachment selected to act, within a range of movements, as a longitudinal articulated attachment articulated about a longitudinal axis parallel to the direction of advancement, or as a longitudinal articulated attachment articulated about a longitudinal axis parallel to the direction of advancement configured to provide the first conveyor belt with a freedom of twisting movement of at least 5° between the successive links.

19. The object conveying and orienting device according to claim 18, wherein the transverse articulated attachment is provided by transverse pins, perpendicular to the direction of advancement of the first conveyor belt, inserted into housings of two consecutive links of the first conveyor belt or of two consecutive links of a drive chain on which the links are fixed, and wherein the longitudinal articulated attachment is provided by:

the pins and the corresponding housings including the mentioned selected clearance; or longitudinal pins, parallel to the direction of conveyance of the first conveyor belt, inserted into housings of two consecutive links of the first conveyor belt or of two consecutive links of the drive chain.

20. The object conveying and orienting device according to claim 18, wherein the chain of flat links covers, excluding the openings in communication with the suction cups, at least 95% of the mentioned at least a first opening in communication with the suction chamber.

\*    \*    \*    \*    \*